United States Patent
Clark et al.

(10) Patent No.: US 8,711,404 B1
(45) Date of Patent: Apr. 29, 2014

(54) AUTOMATICALLY SELECTING A PAPER WITH INCREASED DIMENSIONS THAN ORIGINALLY DESIRED FOR PRINTING AND ADDING ADVERTISEMENT CONTENT TO THE INCREASED DIMENSIONAL AREA OF THE PAPER

(75) Inventors: Ryan Clark, Highland Heights, OH (US); Lance Osborne, Highland Heights, OH (US); Todd Goldstein, Shaker Heights, OH (US); Nathan Lambert, University Heights, OH (US); Ganesh Iyer, Twinsburg, OH (US)

(73) Assignee: The Printer Project, LLC, Shaker Heights, OH (US)

( * ) Notice: Subject to any disclaimer, the term of this patent is extended or adjusted under 35 U.S.C. 154(b) by 37 days.

(21) Appl. No.: 12/964,835

(22) Filed: Dec. 10, 2010

Related U.S. Application Data (60) Provisional application No. 61/285,251, filed on Dec. 10, 2009.

(51) Int. Cl.
*G06F 3/12* (2006.01)
(52) U.S. Cl.
USPC ...... 358/1.15; 705/14.1; 705/14.4; 705/14.69
(58) Field of Classification Search
USPC ............... 358/1.15; 705/14.1, 14.4, 14.69
See application file for complete search history.

(56) References Cited

U.S. PATENT DOCUMENTS

| | | | | |
|---|---|---|---|---|
| 6,629,705 | B1 * | 10/2003 | Ellis | 283/56 |
| 7,167,656 | B2 * | 1/2007 | Koike | 399/8 |
| 2008/0291471 | A1 * | 11/2008 | Uchida | 358/1.6 |
| 2008/0313035 | A1 | 12/2008 | Peeters et al. | |
| 2009/0171750 | A1 * | 7/2009 | Zhou et al. | 705/10 |

FOREIGN PATENT DOCUMENTS

EP   1 186 992 A2 *   3/2002

* cited by examiner

*Primary Examiner* — Eric A Rust
(74) *Attorney, Agent, or Firm* — McDonald Hopkins LLC (57) ABSTRACT

A method is provided to allow the use of paid promotional advertisements within physically printed document, either by using the blank space on a printer cover pages, or through insertion of useful document fragments on a target basis to the user, printer, room, user group, or other easily targetable criteria. Printer cover pages provide otherwise unused target are available for printed advertisements to a user. Additionally, the use of extended length paper stock in 8½ by 14 inch paper is provided having an 8½ by 11 inch upper portion integrally formed with a 8½ by 3 inch lower portion, integrally connected an separated by a foldable, tearable perforation laterally across the demarcation. Advertisements may occupy all previously blank space on the cover page; or the cover page may be divided into smaller sections and used to display multiple advertisements; or advertisements can be organized and positioned solely within the lower portion of the paper stock (with the user's requested printout maintained within the 8½ by 11 inch upper portion).

20 Claims, 10 Drawing Sheets

AUTOMATICALLY SELECTING A PAPER WITH INCREASED DIMENSIONS THAN ORIGINALLY DESIRED FOR PRINTING AND ADDING ADVERTISEMENT CONTENT TO THE INCREASED DIMENSIONAL AREA OF THE PAPER

RELATED APPLICATIONS

The present invention claims benefit of U.S. Provisional Application 61/285,251, filed on Dec. 10, 2009 and incorporated by reference as if fully rewritten herein.

BACKGROUND OF THE INVENTION

1. Field of the Invention

The present invention generally relates to the management of computer network printing and the auxiliary use of automatically generated printed advertising content onto printer cover pages or onto individual printer content pages.

2. Description of the Related Art

Public printing in higher education institutions has gone through some dramatic changes in the past 20 years. There was a time during much of the 90's and early 2000's that printing was entirely subsidized in academic institutions. Since the early 2000's, that model has shifted to a cost recovery model for public printing in these same institutions. By 2005, most public and private institutions like had begun charging for printing to recoup the entire cost of printer leases, paper, toner as well as the service contracts. In some cases, institutions make a modest profit depending on their volume of printing. In 2010, many institutions have again shifted to a more hybrid model of cost recovery for printing. Many institutions are opting for a predefined amount of free prints (usually between 50 & 500 impressions) and then charge after that threshold has been reached.

In the Higher Education market, public printing is further compounded by the fact that printing is handled in a decentralized way. Within each University, there are many departments that might host and consequently subsidize printing for the campus. Computer labs within each school or department, student affairs and libraries all handle printing policies, printer contracts, and pricing separately. This makes it difficult to implement a one size fits all printing policy for an entire University.

This pattern has been remarkably similar in Public Libraries as with that in the higher education counterparts. One notably difference is that Public libraries never fully subsidized printing the way higher education had in the 1990's. Instead, Public libraries had settled for a cost recovery model early on. Today those cost recovery models are still in place but often times the public libraries subsidize a portion of free printing to the public. This portion of free printing is usually along the lines of 10 free impressions per day.

In universities, libraries, or other public institutions, a large number of users share a small number of printers. When a user prints to a specific printer or a bank of printers, it is useful to identify this user's document when they are printed. While several methods of doing this exist, including printers that wait for a user to enter a code to retrieve his document, and printers that deliver documents to a mailbox or carousel, the most common method of identifying printed documents is to print a cover page preceding the document. The cover page often, but not always, is of a different color of paper, different size, or other distinguishing characteristic that makes it easy to identify the beginning of a printed document in a stack of many printed documents. Such cover pages often include data printed on them such as the computer name of the user who printed it, technical numbers that track the print job, the printer name to which it was send by servers, and other data.

Typically in such printing environments the cost of printing each page of paper varies greatly. Minimum base costs can be estimated as between ¼ to ½ cent per page for letter sized paper and ½ to 2 cents per page for depletion of printer consumables such as toner, imaging drum life, and printer useful life.

A minor element of these overall costs represents the identifying cover sheet, in which most of the paper area is blank space. In a large printing environment the printing of cover pages represent thousands or tens of thousands of dollars of printing costs per year. And, this is a fraction of the overall costs of the entire printing volume, whether subsidized by the institution or reimbursed by the individual users.

Consequently, any method or mechanism that can further subsidize the individual users, and/or reduce the overall printing costs to the institution, would be welcome and beneficial to these institutions and their users.

BRIEF SUMMARY OF THE INVENTION

The present invention provides an opportunity to subsidize the individual users, and/or reduce the overall printing costs to an institution through the use of paid promotional advertisements within the physically printed document, either by using the blank space on printer cover pages, or through insertion of useful document fragments on a target basis to the user, printer, room, user group, or other easily targetable criteria. Printer cover pages provide a primary opportunity to target printed advertisements to a user. A secondary opportunity exists with the use of extended length paper stock in 8½ by 14 inch paper is provided having an 8% by 11 inch upper portion integrally formed with a 8½ by 3 inch lower portion, integrally connected an separated by a foldable, tearable perforation laterally across the demarcation. Advertisements may occupy all previously blank space on the cover page; or the cover page may be divided into smaller sections and used to display multiple advertisements; or advertisements can be organized and positioned solely within the lower portion of the paper stock (with the user's requested printout maintained within the 8½ by 11 inch upper portion). Through these mechanisms the sale of advertisements, as well as the ability to target and track them thereby increasing their value, provides an opportunity to offset the institutional cost of printing cover pages and potentially provide a significant revenue stream for the institution.

The invention described herein provides a method for using software to make use of blank space in printer cover pages or removable, or the space on perforated coupon segments of each page, by inserting additional document fragments and graphics from other sources onto these pages in either a segmented or non-segmented page format. The document fragments, including graphics, text, or both, primarily are designed for the display of advertisements. However, the system may also be used to insert university, institution or company announcements, a calendar of events, or other useful information. The software provides a method of tracking and counting the insertion of many different document fragments and targeting the printing of each document fragment based on a predefined rubric.

While the preferred embodiment of the present invention, at the time of this disclosure, in intended for initial use at public self-service printing locations used in higher education as well as public libraries, a person having ordinary skill in the relevant art, in light of the present teachings, would find it obvious to extend these teachings to be generally applied in any public service location as well as some private service locations.

It is anticipated that the present invention may be implemented via co-location of printer drivers and servers interconnected via the Internet. Also commonly referred to as the "cloud" in cloud computing, the use of such methods provides the means through which all the necessary elements—from computing power to computing infrastructure, applications, business processes to personal collaboration—can be delivered to the individual user as a service wherever and whenever it is needed. In general the cloud—similar to its namesake of the cumulus type—is fluid and can easily expand and contract. This elasticity means that as the number of customers increase, then additional resources can increase on demand. And, just as easily, those resources can be released when they're no longer needed without having to step foot on the printer installation site.

This elasticity is one of the main reasons individual, businesses, and information technology (IT) users are moving to the cloud. In the traditional data center it has always been possible to add and release resources. However, this process couldn't be done in an automated or self-service manner. With the implementation of this type of infrastructure in the present invention the easy scalability of print solutions can be accomplished across thousands of institutions while maintaining the print management software and hardware in one central management environment.

This software tools necessary to create a complete and comprehensive printer management, advertising campaign and invoicing solution may be made up of two separate modules: Administrative; and Print Management. The Administrative Module is envisioned as having three logically distinct interfaces. The first will manage advertising campaigns and allow each advertiser to negotiate terms of their campaign with information such as start and end date for the campaign, advertisement images to run and cost per impression. This will also allow for there to be a limit on periodic expenditures for the campaign as well as a final limit to stop the campaign based on the advertisement run rate. The Contact Management module is intended to operate similar to a Contact Relationship Manager (CRM) solution, and should maintain information necessary for the sale of advertisements such as, for example, contact address, phone, email, as well as follow up alert definitions and information about when campaigns are coming to a close. The invoicing interface will take information from the campaign and contact management interfaces and generate an electronic report necessary for billing the advertisers. This will allow for both a printed invoice as well as an electronic invoice that can be sent by electronic mail to the advertiser. This invoice interface may also have an internal reporting mechanism that will estimate profit margin/loss and run other reports necessary to forecasting revenue for each location. This interface can also have the ability to systematically export this data in an extensible markup language (or XML) format for incorporation into a larger company wide interface for reporting of all sites. Finally, the invoicing interface may have the ability to handle multiple billing situations. For instance, if a site chooses to be invoiced once per year it must accommodate that as well as if site chooses to be billed once per month.

In its most basic sense, this software is a remote implemented print server. This print management module captures the print request from a client computer and compiles the printed image in a remote location to fit the needs of the institution that provides the printing service such as, for example, a library, a school or a public printing location. This module may also have the ability to manage all image files that are used in the production of the final print ad delivered to the user. It is anticipated that this architecture will be fast and scalable in order to manage hundreds of thousands of images used in a campaign. There may also exist a template management interface that allows for the configuration of different templates are requested and negotiated by the installation site during the sales process. Finally, a print queue software may be used to handle multiple printer configurations. Any one site may have one or many printers installed, and this print queue software is anticipated as being capable of managing print jobs for all the possible locations. In each instance, the printer job is received, processed, assigned a template, scaled down the original print request, and sent to the printer for final production.

Advertisements may be sold for the various regions of each individual print job. These print jobs can use one or more templates that dictate the layout for the final production in order to print at the appropriate size and location. Large full page ads may also be an option as a cover letter for each print job. This template will utilize advertisements that are specifically managed in the campaign management software and with content stored in the image management interface.

The second template could be similar in layout to the first template however with a major difference. This template would give consideration to the content being displayed in the content area section and have the ability to match up ads based on keywords found in the content. This template could integrate directly with the ad management interface, or also could be used in situations where third party ad services are used, such as, for example, Hey Butler®, Groupon®, Ebates® or ValueClick®, just to name a few ad service providers. Such templates or third party providers can also be installed and configured at each individual installation site.

This advertisement template can further have the ability to display multiple ads, such as many as 10 side bar ads, or as few as none. If there are no banner ads, the template could utilize the space on the page for more content to be displayed on the page. The same is true for the side bar ads.

As know to those skilled in the art, using information from a database, such as age, gender, classes taken, etc., to better target a specific advertisement to a defined demographic increases the value of each impression of that advertisement. Advertisements that contain serialized coupons or other tracking information used to redeem offers allow an advertiser to better refine the rubric used to target advertisements using closed loop feedback.

BRIEF DESCRIPTION OF THE DRAWINGS

The advantages and features of the present invention will become better understood with reference to the following more detailed description and claims taken in conjunction with the accompanying drawings, in which like elements are identified with like symbols, and in which:

DESCRIPTION OF THE PREFERRED EMBODIMENTS

The best mode for carrying out the invention is presented in terms of its preferred embodiment, herein depicted within the FIGS. 1 through 4.

1. DETAILED DESCRIPTION OF THE FIGURES

Figure 1:
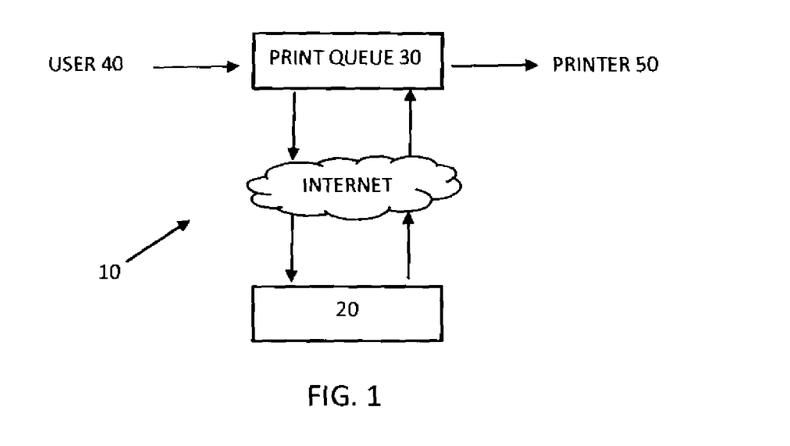
FIG. 1 is a schematic block diagram showing computer network printing system for automatically generating and inserting printed content according to the preferred embodiment of the present invention.

Referring now to FIG. 1, a computer network printing system for automatically generating and inserting printed content is shown, generally noted as 10, according to the preferred embodiment of the present invention, in which a user requested print document is processed, or modified, by a remote implemented print server 20. A print management module captures the print request 30 from a client computer 40 and compiles the printed image in a remote location to fit the needs of the institution that provides the printing service such as, for example, a library, a school or a public printing location. The print management module residing on the server 20 modifies a printed document 50 while that document is in a computer print queue 30. The remote implemented print server 20 may access the printing queue 30 of an existing server to modify a printing cover page or insert a cover page that did not exist, or to modify the print content and insert advertising content that did not previously exist to a portion of the page. Variations in the intended output will be described in greater detail below.

Figure 2A:
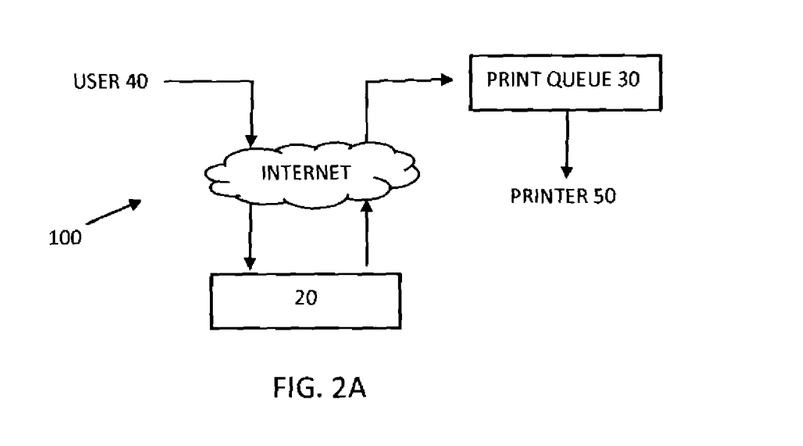
FIG. 2a is a schematic block diagram showing a first alternate embodiment thereof in which documents may immediately be sent from a print server.

The computer network printing system for automatically generating and inserting printed content may vary from this preferred configuration by also acting as a printing device, as shown in FIG. 2a and generally noted as 100. In this variation, the remote implemented print server 20 may receive the user print request 40 directly and immediately resend the documents to the local print queue 30. Further, the remote implemented print server 20 may also act as a printing device to a print queue 30, as in FIG. 2b and thereby modify a printing cover page or insert a cover page that did not exist after the document leaves the computer print queue 30.

Figure 3A:
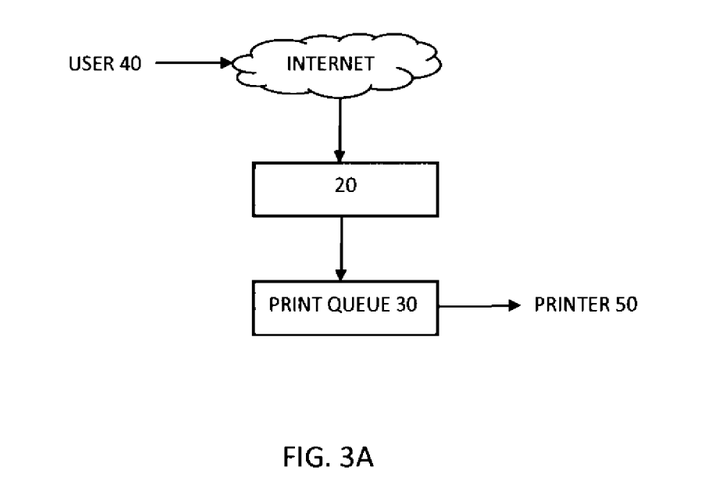
FIG. 3a is a schematic block diagram showing a second alternate embodiment thereof in which the invention acts as the print server to a user.
Figure 3B:
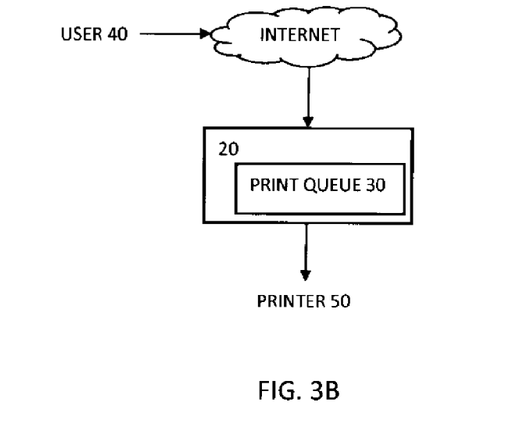
FIG. 3b is a schematic block diagram showing a variant of the second alternate embodiment in which the invention also contains a print queue (i.e. performs all printing jobs necessary of a print server)

As shown in FIG. 3a, a second alternate embodiment of the remote implemented print server 20 is shown in which the server 20 as directly as a print server to a user 40, with the content modified, as described in greater detail below, and directed to the local print queue 30. Unlike the variant shown in FIG. 2a, the user 40 prints directly to the server 20. Similarly, as shown in FIG. 3b, a variant of the second alternate embodiment is shown in FIG. 3b in which the remoted implemented print server 20 also contains a print queue 30 (i.e. performs all printing jobs necessary of a print server).

Figure 4:
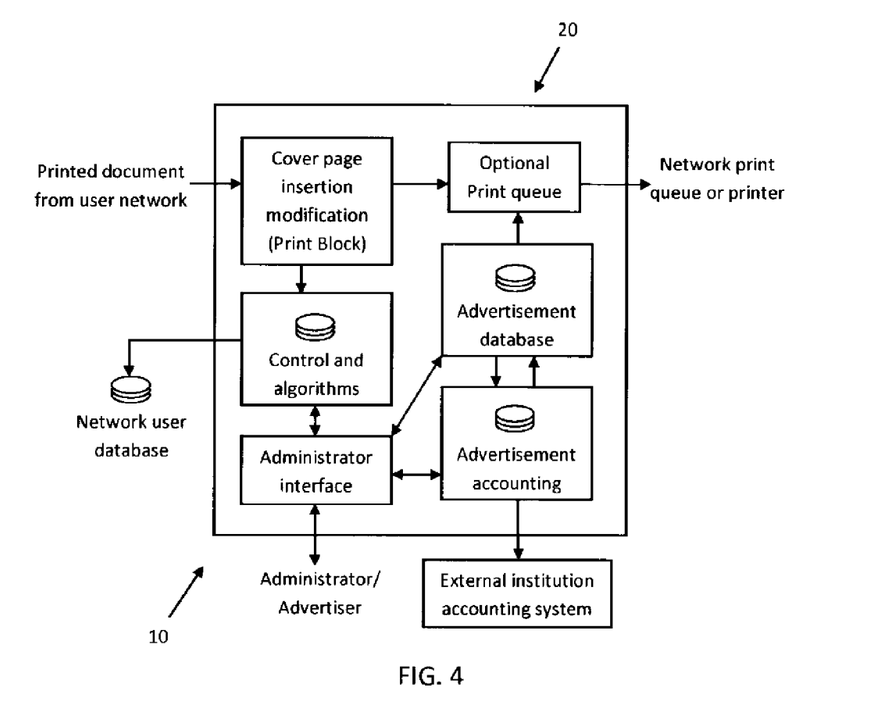
FIG. 4 is a block layout of the internal configuration of the invention in its preferred embodiment.

As shown in conjunction with FIG. 4, a block layout of the internal configuration of the computer network printing system for automatically generating and inserting printed content 10 is shown according to the preferred embodiment of the present invention in which an assembly of software, databases, and interfaces to one or more printing queue and network printer is provided. Additionally, the present invention may access an institution database to retrieve user specific information, typically demographic information. The assembled invention may exist in an existing computer server or be enclosed in a separate hardware device that interfaces to an existing network, printers, databases, and other resources.

2. OPERATION OF THE PREFERRED EMBODIMENT

Figure 2B:
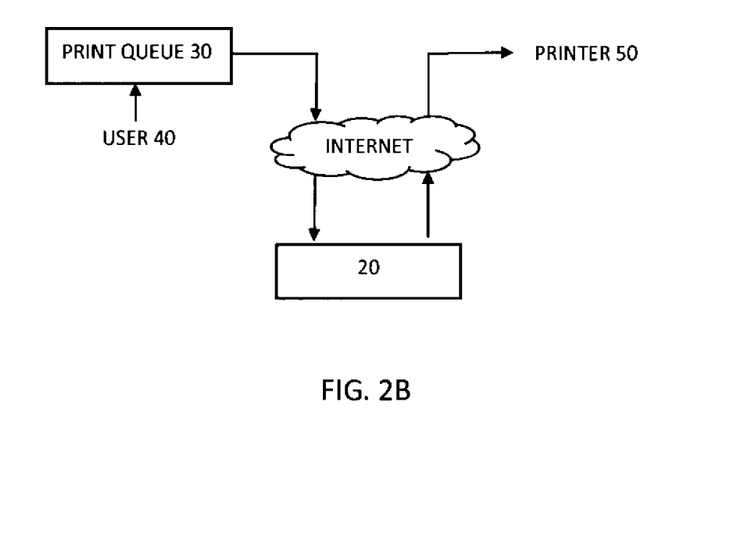
FIG. 2b is a schematic block diagram showing a variant of FIG. 2a in which the present invention may also act as a printing device.

The preferred embodiment of the present invention may operate in a number of fundamental ways. It may access the printing queue of an existing server and modify a printing cover page, or insert a cover page that did not exist, or generated printed advertising content onto printer cover pages or onto individual printer content pages, as shown in FIG. 1. It may also intercept printing job documents either entering the printing queue, as shown in FIG. 2a, or leaving the printing queue, as shown in FIG. 2b, to modify a printing cover page, or insert a cover page that did not exist, or generated printed advertising content onto printer cover pages or onto individual printer content pages. Further, as shown in FIG. 3a, the present invention may act as the user print server and insert a cover page or advertising content on individual printer content pages before sending the document to a downstream printing queue, or directly to printer hardware, as shown in FIG. 3b. In each of these fundamental methods of operation, the present invention may use data contained in the print job to access databases and determine which advertisements or other document fragments to insert into the printer cover page or individual content page. An appropriate advertiser account is then debited for the insertion of each advertisement.

According to the preferred embodiment, it is intended that advertisers have access in real time or delayed time to account information as well as the option to refine placement rubrics based on feedback relating to the effectiveness of ad placement. As shown further in FIG. 4, the present invention includes basic tools required by an institution to bill an advertiser as well as provide detailed information about the ads printed. These tools provide import and export capabilities as well as links to other accounting systems and databases The present invention may make use of a link to an institution's database of current users as well as detailed information the institution has about these users (such as gender, age, field of study, department, etc.). This additional user information allows an advertiser to use a rubric to target a user more specifically. For example, an advertiser may only want to advertise to users who are female, between 21 and 25 years of age, and an undergraduate. The invention links to the institution databases using a common standardized method know to those skilled in the art. This method will commonly be, but not limited to, Lightweight Directory Access Protocol (LDAP), or Structured Query Language (SQL) and its variants.

It is anticipated that the present invention contains algorithm to choose the best ads to insert into each cover page based on many factors. It may be configured to maximize profit to the institution, mix announcements with advertisements, or, for example, insert the institution's calendar of events on the first page a user prints each day. Cover pages are divided into a number of geometric printing regions (FIG. 5b, example) in any configuration that then can be used to charge advertisers based on advertisement size. Advertisements may occupy one or more adjacent geometric printing region.

In the preferred embodiment of the present invention, the software, databases, and interconnection to an existing computer network are embedded on a micro-computer system in a dedicated hardware device. It may, however, also share an existing hardware device with other software and applications. In its preferred embodiment, the invention acts as a printing document pass-through with optional print queue allowing it to sit in any of the network locations detailed in FIG. 1 through FIG. 3. It should be obvious to a person having ordinary skill in the relevant art that the present invention may interface to a network user database and institution billing system using standardized network protocols. As such, the present invention may also contain an administrator/advertiser interface as a web page or specialized software application.

The preferred embodiment of the invention contains a database of advertisements, a database of advertiser accounting data, an administrator interface, and a control block and database in addition to the printing block and optional print queue as shown in conjunction with FIG. 4. In operation, when a print job enters the print block:

(1) the print user is extracted and sent to the control block;
(2) the control block retrieves useful information from the network user database;
(3) it control block uses information retrieved from the institution database and rubrics stored in the control block to choose advertisements stored in the advertisement database;
(4) the advertisements are sent to the print block;
(5) the advertisement insertion is logged, and the advertiser is debited in the advertiser accounting database; and
(6) the print block inserts the advertisement(s) and sends the document to the optional print queue or to the network.

Figure 5A:
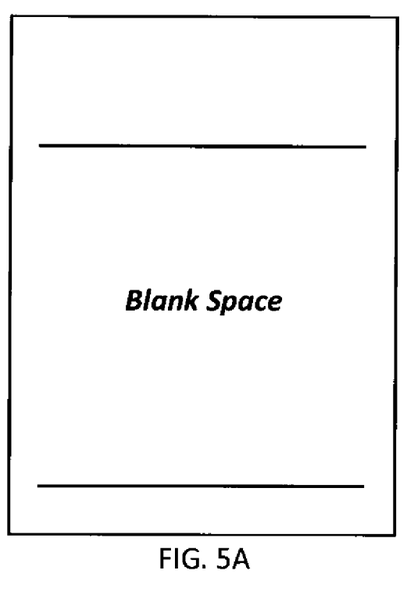
FIG. 5a is an example of a printer cover page and the blank space that may be on it.
Figure 5B:
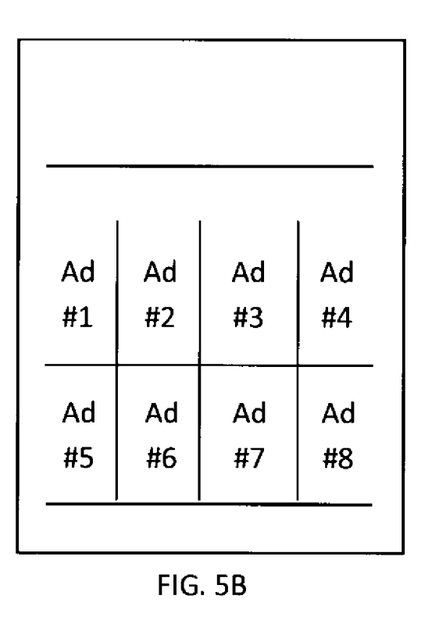
FIG. 5b shows this free space subdivided into geometric regions that may have advertisements inserted.
Figure 6A:
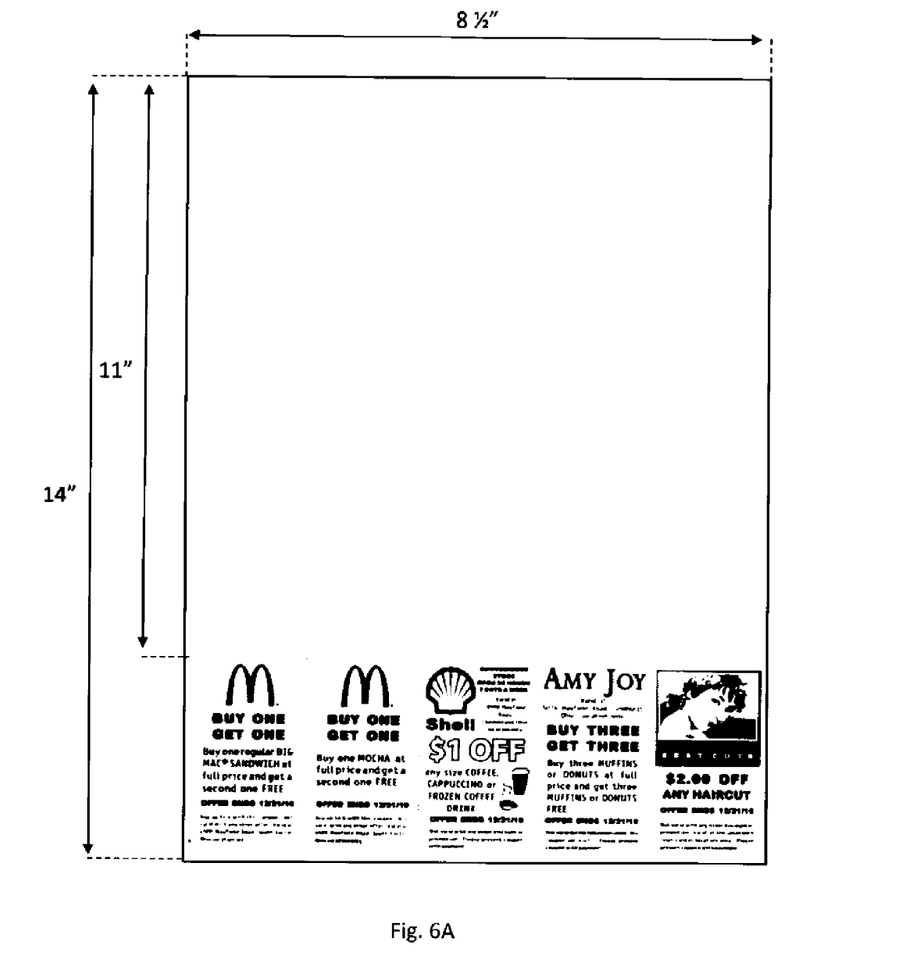
FIG. 6a through FIG. 6f show examples of automatically generated printed advertising content onto individual printer content pages.
Figure 6B:
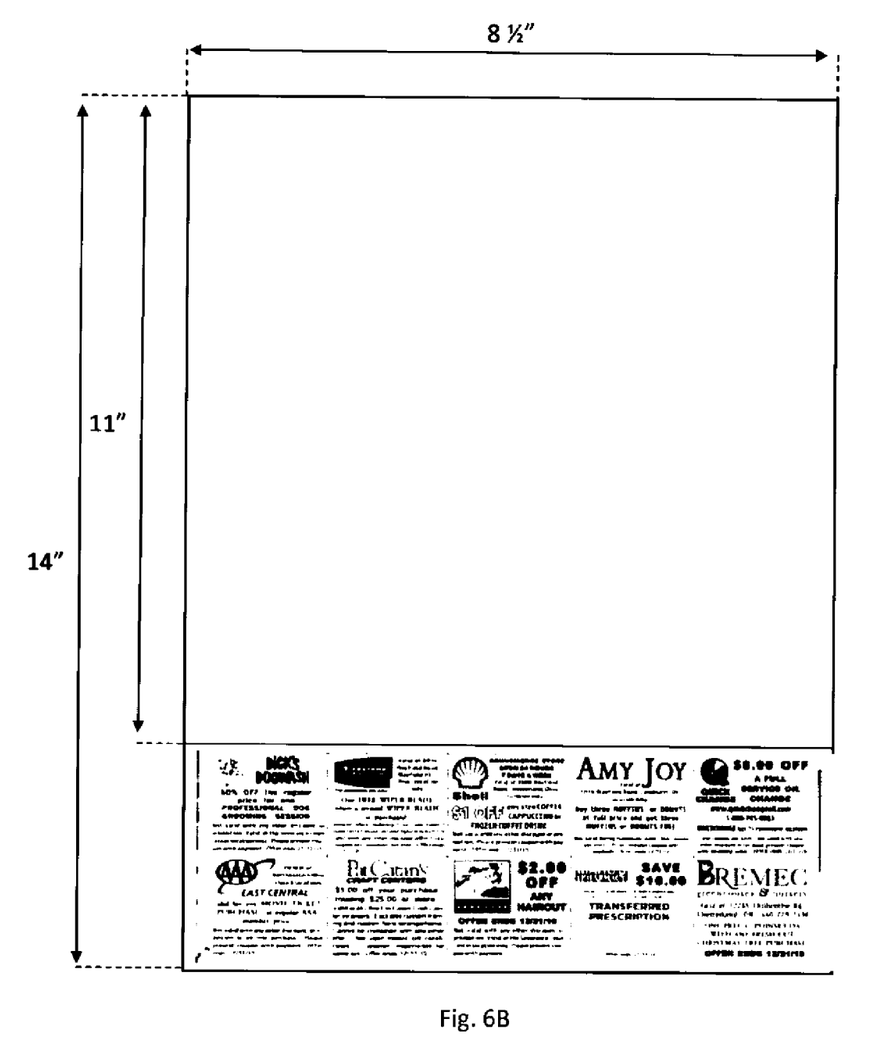
Figure 6C:
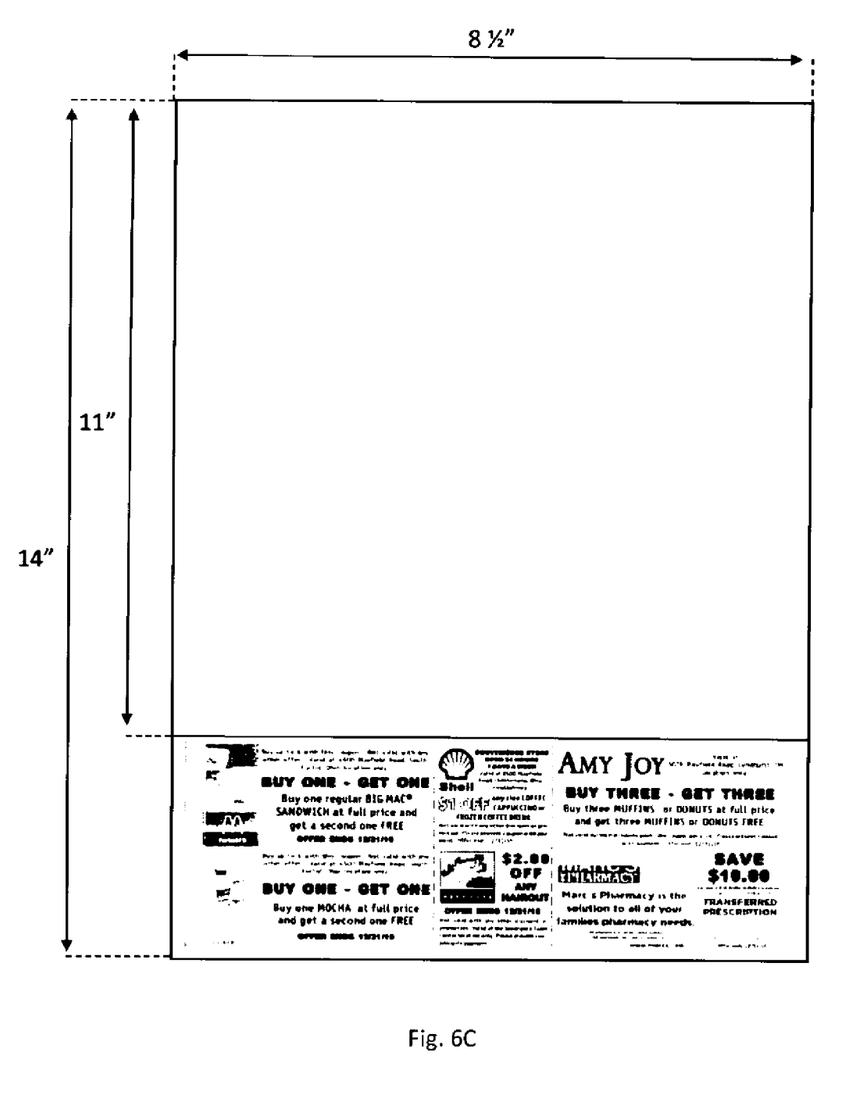
Figure 6D:
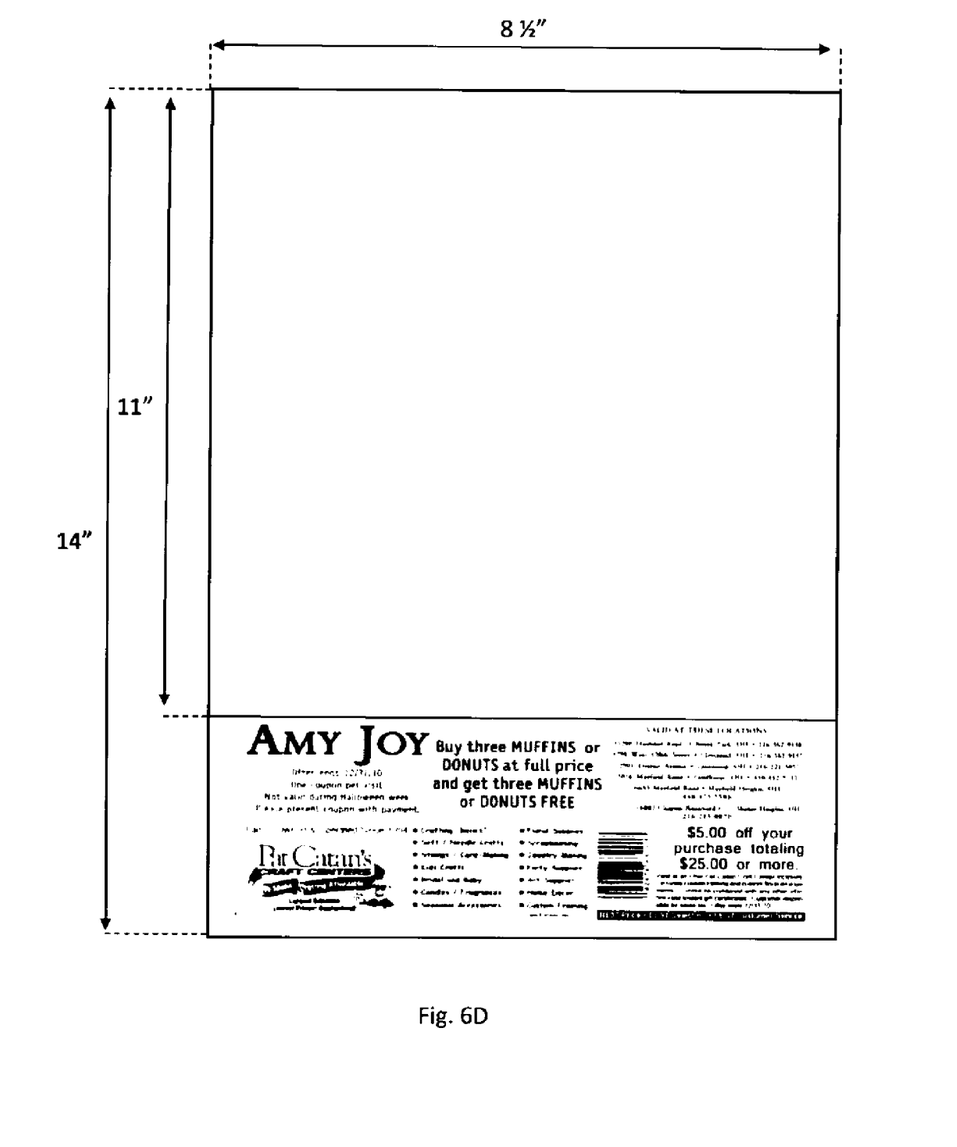
Figure 6E:
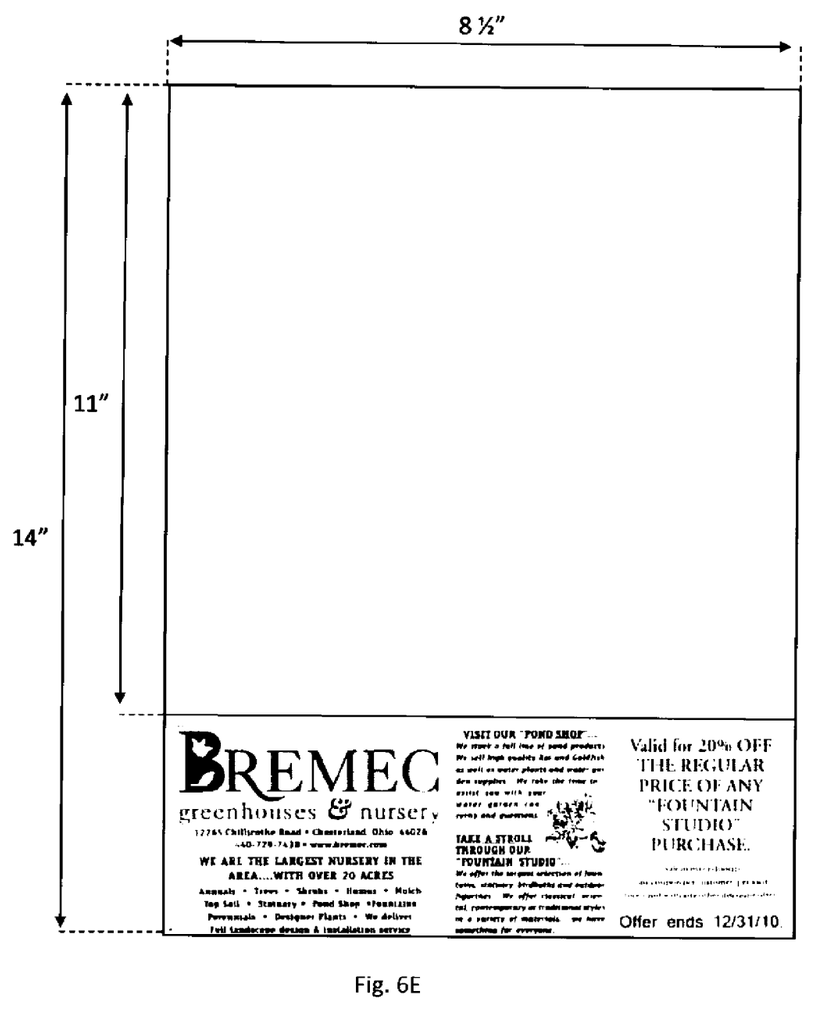
Figure 6F:
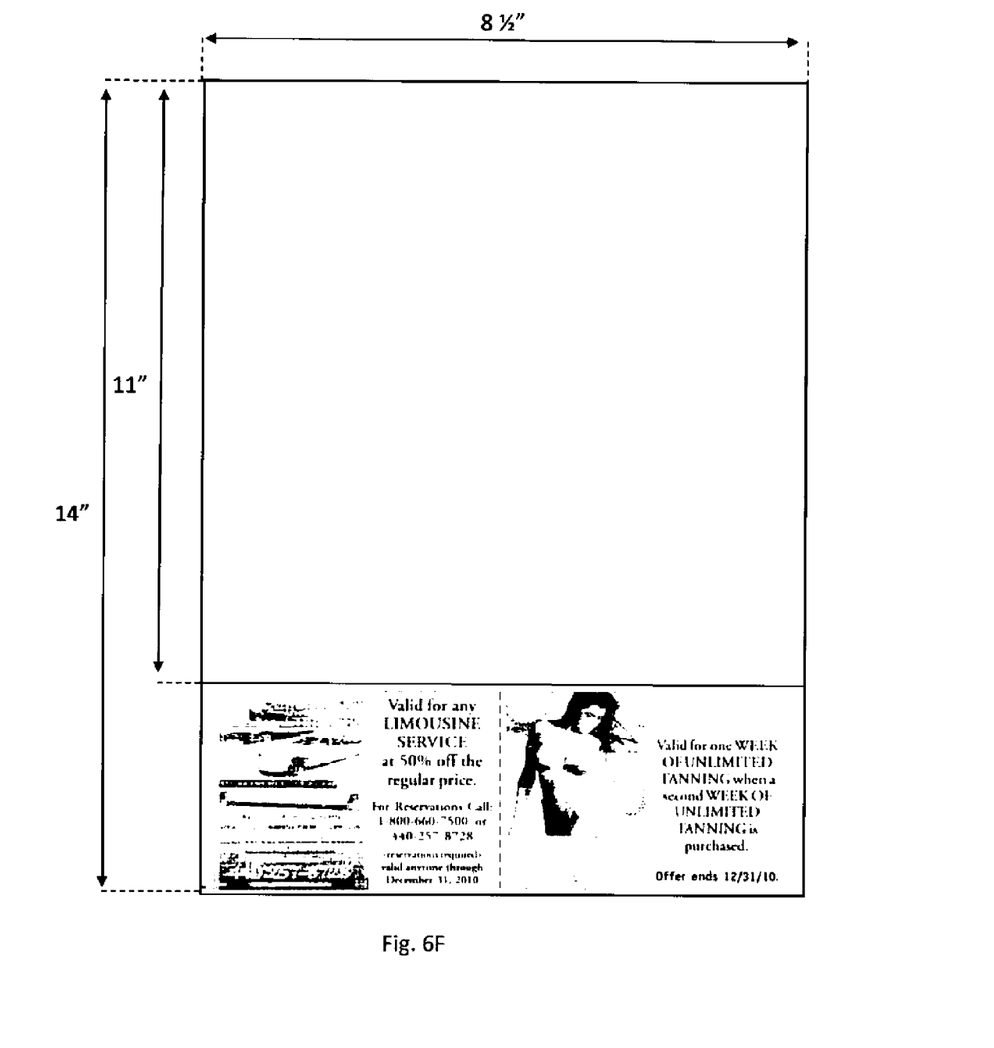

It is a key element of the present invention to be able to subsidize the individual users, and/or reduce the overall printing costs to an institution through the use of paid promotional advertisements within the physically printed document, either by using the blank space on printer cover pages, or through insertion of useful document fragments on a target basis to the user, printer, room, user group, or other easily targetable criteria. As such, a necessary element is a physical printed document in which an advertisement or promotional coupon can be created. While the number, types and methods of generating this physical printed advertisement should not be limited, for purposes of enabling a preferred embodiment at the time of this disclosure it is anticipated that a printer cover page, as shown in conjunction with FIG. 5a-5b, provides a primary opportunity to target printed advertisements to a user. A alternate embodiment exists with the use of extended length paper stock, as shown in conjunction with FIG. 6a-6f, in which 8½ by 14 inch paper is provided having an 8½ by 11 inch upper portion integrally formed with a 8½ by 3 inch lower portion, integrally connected an separated by a foldable, tearable perforation laterally across the demarcation. Advertisements may occupy all previously blank space on the cover page; or the cover page may be divided into smaller sections and used to display multiple advertisements; or advertisements can be organized and positioned solely within the lower portion of the paper stock (with the user's requested printout maintained within the 8½ by 11 inch upper portion). Through these mechanisms the sale of advertisements, as well as the ability to target and track them thereby increasing their value, provides an opportunity to offset the institutional cost of printing cover pages and potentially provide a significant revenue stream for the institution. Advertisements may be sold for the various regions of each individual print job. These print jobs can use one or more templates that dictate the layout for the final production print. For example, in the template layout shown in FIG. 6a through 6f show salable regions to be located on a portion of each content page of a print layout for advertisers to purchase. Large full page ads will also be an option as a cover letter for each print job. Typically, print output requested in an 8½ by 11 inch format. The use of extended length paper stock in 8½ by 14 inch paper can thereby provided an 8½ by 11 inch upper portion integrally formed with a 8½ by 3 inch lower portion. The creation of a perforated connection can thereby form a separate foldable, tearable perforation laterally across the demarcation to allow newly printed coupon or advertisement to be removed without adverse effect on the print content itself.

The creation of the advertising content itself can be done in a number of ways. As should be apparent to a person having ordinary skill in the relevant art, in light of the present teachings, the use of pre-printed advertisement content can applied onto the integrally formed 8½ by 3 inch lower portion, thereby merely providing a blank 8½ by 3 inch content area ready for print requests. This would allow the creation of a perforated connection can thereby form a separate foldable, tearable printed coupon or advertisement to be removed without adverse effect on the print content itself. However, such a method would lack the ability to allow for the use creating targeted, specific, real-time generated adverting content. To allow for these later features, it is anticipated that particular templates would be used that have the ability to have as many as 10 side bar advertisements and as few as 0 without impacting the layout of the page. This template will utilize advertisements that are specifically managed in a campaign management software and with content store in an image management interface.

An alternate, second template could be similar in layout to the first template however with a major difference. This template would give consideration to the content being displayed in the content area section and have the ability to match up ads based on keywords found in the content. This template would not integrate directly with an ad management interface, but rather would be used in situations where we are using a third party ad service are utilized (such as, for example, Hey Butler®, Groupon®, Ebates®, ValueClick® or the like).

As know to those skilled in the art, using information from a database, such as age, gender, classes taken, etc., to better target a specific advertisement to a defined demographic increases the value of each impression of that advertisement. Advertisements that contain serialized coupons or other tracking information used to redeem offers allow an advertiser to better refine the rubric used to target advertisements using closed loop feedback.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the Claims appended hereto and their equivalents. Therefore, the scope of the invention is to be limited only by the following claims.

What is claimed is:

1. A method performed by a server for incorporating one or more advertisements within a physically printed document, comprising:
   a. capturing a print request by the server from a client computer, said print request including at least dimensions indicating a size of a first paper stock a page of the print request is intended to be printed on and printing data intended to be printed on a page of the first paper stock;
   b. selecting, automatically by the server, from a plurality of printing templates in a memory at the server, a printing template, the printing template dictating a printing layout corresponding to a second paper stock and comprising a first portion and a second portion, the first portion having dimensions that correlate to the dimensions included in the print request, wherein the second portion is located outside of the first portion and outside of the dimensions included in the print request, wherein each of the plurality of printing templates dictates a printing layout;
   c. creating, automatically by the server, a second print request by at least inserting, automatically by the server, the printing data of a page of the print request into the first portion, and inserting, automatically by the server, an advertisement into the second portion; and
   d. directing, automatically by the server, the second print request to a printer for printing a page with an inserted advertisement on the second paper stock, wherein the server is separate from the printer and the client device.

2. The method of claim 1, wherein said inserted advertisement comprises graphics, text, or both, for the display of advertisements, announcements, or calendar of events.

3. The method of claim 2, further comprising:
   a. tracking and counting the insertion of the advertisement; and
   b. targeting the insertion of the advertisement based on a predefined rubric.

4. The method of claim 1, wherein said second print request is directed to a printer for printing on paper stock having a first portion integrally formed with a second portion, said first portion and second portion connected and separated by a foldable, tearable perforation.

5. A product resulting from the method for incorporating one or more advertisements within a physically printed document of claim 4.

6. The method of claim 1, whereby the advertisement may occupy substantially all of the second portion, or the second portion may be divided into smaller sections and used to display one or more advertisements.

7. The method of claim 1, wherein said capturing the print request from a client computer and said directing the second print request to a printer are accomplished from a remote location.

8. A product resulting from the method for incorporating one or more advertisements within a physically printed document of claim 1.

9. The method of claim 1, wherein one or more of the steps of creating a second print request by at least inserting the printing data of a page of the print request into the first portion, and inserting an advertisement into the second portion are performed remotely.

10. A computer network printing system for generating and inserting printed content comprising:
   a print server operatively connected to both a client computer and a printer;
   a print management module located within the print server, the print management module configured for:
      capturing, automatically, a print request by the print server from the client computer, said print request including at least dimensions indicating a size of a first paper stock a page of the print request is intended to be printed on and printing data intended to be printed on a page of the first paper stock;
      selecting, automatically, from a plurality of printing templates in a memory at the print server, a printing template, the printing template dictating a printing layout corresponding to a second paper stock and comprising a first portion and a second portion, the first portion having dimensions that correlate to the dimensions included in the print request, wherein the second portion is located outside of the first portion and outside of the dimensions included in the print request, wherein each of the plurality of printing templates dictates a printing layout;
      creating, automatically, a second print request by at least inserting, automatically by the print server, the printing data of a page of the print request into the first portion, and inserting, automatically by the print server, an advertisement into the second portion; and
      directing, automatically, the second print request to a printer for printing a page with an inserted advertisement on the second paper stock, wherein the print server is separate from the printer and the client device.

11. The computer network printing system of claim 10, wherein said print server is adapted to receive a print request directly and resend a modified print request to a local print queue.

12. The computer network printing system of claim 10, wherein said print server includes a print queue.

13. The computer network printing system of claim 10, wherein said inserted advertisement comprises graphics, text, or both, for the display of advertisements, announcements, or calendar of events.

14. The computer network printing system of claim 10, wherein one or both of said print server and said print management module are remotely located.

15. The computer network printing system of claim 10, wherein said system further includes a module for tracking and counting the insertion of the advertisement; and targeting the printing of the advertisement based on a predefined rubric.

16. The computer network printing system of claim 10, wherein said printer includes paper stock having an upper portion integrally formed with a lower portion, said upper portion and lower portion connected and separated by a foldable, tearable perforation.

17. A non-transitory computer-readable medium comprising executable instructions for:
   capturing a print request by a server from a client computer, said print request including at least dimensions indicating a size of a first paper stock a page of the print request is intended to be printed on and printing data intended to be printed on a page of the first paper stock;
   selecting, automatically by the server, from a plurality of printing templates in a memory at the server, a printing template, the printing template dictating a printing layout corresponding to a second paper stock and comprising a first portion and a second portion, the first portion having dimensions that correlate to the dimensions included in the print request, wherein the second portion is located outside of the first portion and outside of the dimensions included in the print request, wherein each of the plurality of printing templates dictates a printing layout;

creating, automatically by the server, a second print request by at least inserting, automatically by the server, the printing data of a page of the print request into the first portion, and inserting, automatically by the server, an advertisement into the second portion; and directing, automatically by the server, the second print request to a printer for printing a page with an inserted advertisement on the second paper stock, wherein the server is separate from the printer and the client device.

18. The non-transitory computer-readable medium of claim 17, wherein said inserted advertisement comprises graphics, text, or both, for the display of advertisements, announcements, or calendar of events.

19. The non-transitory computer-readable medium of claim 17, further comprising executable instructions for:

tracking and counting the insertion of the advertisement; and targeting the insertion of the advertisement based on a predefined rubric.

20. The non-transitory computer-readable medium of claim 19, further comprising executable instructions for:

managing advertising campaigns and allowing advertisers to negotiate terms of a campaign; and maintaining information relating to the sale of advertisements.

* * * * *